(12) United States Patent
Wada et al.

(10) Patent No.: US 7,452,602 B2
(45) Date of Patent: Nov. 18, 2008

(54) VINYLIDENE FLUORIDE-BASED RESIN FILM

(75) Inventors: Kazuhito Wada, Hyogo (JP); Yukihiro Shimamoto, Osaka (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 11/659,633

(22) PCT Filed: Aug. 10, 2005

(86) PCT No.: PCT/JP2005/014684
§ 371 (c)(1),
(2), (4) Date: Feb. 7, 2007

(87) PCT Pub. No.: WO2006/016618
PCT Pub. Date: Feb. 16, 2006

(65) Prior Publication Data
US 2007/0276107 A1    Nov. 29, 2007

(30) Foreign Application Priority Data
Aug. 11, 2004    (JP) .............................. 2004-234790

(51) Int. Cl.
*B32B 27/28* (2006.01)
*B32B 27/50* (2006.01)
*B32B 37/15* (2006.01)
*C08L 27/16* (2006.01)

(52) U.S. Cl. .................. 428/422; 428/421; 428/515; 428/520; 428/522; 428/403; 428/407; 525/70; 525/72; 525/78; 525/80; 525/199; 525/222; 525/227; 526/242; 526/250; 526/255

(58) Field of Classification Search .................... None
See application file for complete search history.

(56) References Cited

U.S. PATENT DOCUMENTS 3,701,749 A  *  10/1972  Segawa et al. ............... 524/90

(Continued)

FOREIGN PATENT DOCUMENTS

EP          0 060 421          9/1982

(Continued)

OTHER PUBLICATIONS

Notification of Transmittal of Copies of Translation of the International Preliminary Report on Patentability for international application serial No. PCT/JP2005/014684, (Mar. 1, 2007).

(Continued)

*Primary Examiner*—Vivian Chen
(74) *Attorney, Agent, or Firm*—Hamre, Schumann, Mueller & Larson, P.C.

(57) ABSTRACT

A vinylidene fluoride-based resin film including polyvinylidene fluoride whose average spherocrystal diameter is less than 0.1 μm that is a detection limit or lower by observation using a transmission electron microscope is provided, the average spherocrystal diameter being obtained by shaping a vinylidene fluoride-based resin in a molten state by sandwiching the resin between rollers or metal belts so as to let it cool down. Thereby, a vinylidene fluoride-based resin film and a vinylidene fluoride-based resin multilayered film having excellent transparency, weather resistance, chemical resistance, break resistance and formability are provided.

11 Claims, 2 Drawing Sheets

U.S. PATENT DOCUMENTS

| | | | | |
|---|---|---|---|---|
| 3,719,644 A | * | 3/1973 | Segawa et al. | 525/367 |
| 3,869,534 A | * | 3/1975 | Yoshikawa et al. | 264/210.1 |
| 4,011,874 A | * | 3/1977 | Segawa et al. | 607/95 |
| 4,091,055 A | * | 5/1978 | Kidoh et al. | 525/199 |
| 4,141,935 A | * | 2/1979 | Dunkelberger | 428/220 |
| 4,226,904 A | * | 10/1980 | Ollivier et al. | 428/212 |
| 4,317,860 A | | 3/1982 | Strassel | 428/421 |
| 4,444,826 A | * | 4/1984 | Sasaki et al. | 428/216 |
| 4,526,929 A | * | 7/1985 | Kishida et al. | 525/80 |
| 4,528,311 A | * | 7/1985 | Beard et al. | 524/91 |
| 4,528,330 A | * | 7/1985 | Kishida et al. | 525/85 |
| 4,670,527 A | * | 6/1987 | Mizuno | 526/255 |
| 5,042,924 A | * | 8/1991 | Terasaki et al. | 359/500 |
| 5,132,164 A | * | 7/1992 | Moriya et al. | 428/199 |
| 5,180,634 A | * | 1/1993 | Sempio et al. | 428/336 |
| 5,283,302 A | * | 2/1994 | Wakamori et al. | 526/216 |
| 5,344,904 A | * | 9/1994 | Wakamori et al. | 526/254 |
| 5,382,625 A | * | 1/1995 | Lindner et al. | 525/81 |
| 5,569,524 A | * | 10/1996 | Akatsu et al. | 428/215 |
| 5,773,520 A | * | 6/1998 | Bertelo et al. | 525/309 |
| 6,444,311 B1 | * | 9/2002 | Friedman et al. | 428/354 |
| 6,465,577 B2 | * | 10/2002 | Okanishi et al. | 525/200 |
| 6,476,144 B1 | * | 11/2002 | Okanishi et al. | 525/200 |
| 6,974,858 B2 | * | 12/2005 | Bu et al. | 528/480 |
| 6,989,427 B2 | * | 1/2006 | Pascal | 526/255 |
| 7,173,082 B2 | * | 2/2007 | Ahn et al. | 524/458 |
| 2003/0225208 A1 | * | 12/2003 | Pascal | 525/88 |
| 2005/0032968 A1 | * | 2/2005 | Drujon et al. | 524/515 |
| 2005/0165170 A1 | * | 7/2005 | Pascal | 525/200 |

FOREIGN PATENT DOCUMENTS

| | | | |
|---|---|---|---|
| EP | 0 779 335 | | 6/1997 |
| EP | 1 452 551 | * | 9/2004 |
| GB | 1 473 337 | * | 5/1977 |
| JP | 57-187248 | | 11/1982 |
| JP | 58-154750 | | 9/1983 |
| JP | 60-161148 | | 8/1985 |
| JP | 64-008665 | | 2/1989 |
| JP | 2-151437 | | 6/1990 |
| JP | 3-030945 | | 2/1991 |
| JP | 5-050566 | | 3/1993 |
| JP | 05-239150 | * | 9/1993 |
| JP | 06-080794 | * | 3/1994 |
| JP | 6-080794 | | 3/1994 |
| JP | 9-183179 | | 7/1997 |
| JP | 2000-094577 | * | 4/2000 |
| JP | 2003-129033 | * | 5/2003 |

OTHER PUBLICATIONS

PCT International Preliminary Report on Patentability for international application serial No. PCT/JP2005/014684, (Feb. 20, 2007).
PCT Written Opinion of the International Searching Authority (Translation) for international application serial No. PCT/JP2005/014684, (date unknown).

* cited by examiner

VINYLIDENE FLUORIDE-BASED RESIN FILM

TECHNICAL FIELD

The present invention relates to a vinylidene fluoride-based resin film and a vinylidene fluoride-based resin multilayered film having excellent transparency.

BACKGROUND ART

Since a vinylidene fluoride-based resin has excellent weather resistance and chemical resistance and enables a melt-molding process, the vinylidene fluoride-based resin is used widely as a surface protective film for a tent of a quick-built warehouse, a canvas top of an autotruck and the like as well as a protective film for an illuminated sign, a building material and an exterior film of an automobile. In recent years, the technique of applying a laminated film made of a vinylidene fluoride-based resin and an acrylic-based resin on a surface of a plastic molded product for decoration has been gaining attention as an alternative to painting. Since a protective film or a decorative film is attached to a surface of a base material for use, such a film is required to have transparency allowing print and a pattern applied on the surface of the base material to be recognized clearly. However, the vinylidene fluoride-based resin is a crystalline resin and has a high crystallization rate, and therefore it is extremely difficult to achieve enough transparency.

A method of making a film thinner (see Patent Document 1), a method of copolymerizing another monomer to a vinylidene fluoride-based resin (see Patent Document 2), a method of mixing with a methacrylic-based resin and the like have been proposed so far. However, the films obtained by these methods cannot realize the required transparency.

Another method has been proposed, in which film shaping conditions for processing a vinylidene fluoride-based resin film (e.g., a discharge rate, a take-off rate, a residence time, a difference between a dice temperature and a coolant temperature) are controlled so as to decrease a spherocrystal radius of polyvinylidene fluoride, which is for improving the transparency (see Patent Document 4). However, it is difficult to reduce the average spherocrystal radius to be less than 0.5 μm because of the limitations of an apparatus, and therefore further improvement of the transparency has been required.

Meanwhile, a vinylidene fluoride-based resin multilayered film shaped by co-extrusion with a methacrylic-based resin composition now is gaining strong attention in the market. Specific applications therefore include a protective film laminated on various materials such as plastic, metal and wood, painting for the lamination on internal/external components of an automobile, a film used as an alternative to plating and the like, which are for preventing the deterioration of a base material and keeping the appearance, for example. Moreover, since it is expected that harmful substances discharged from a painting or a plating process will be more. strictly controlled in the future from the environmental standpoint, a film is gaining attention as an alternative to them. Such a film is required to have resistance to breakage by bending (hereinafter called "break resistance") and formability.

Patent document 1: JP S57(1982)-187248 A
Patent document.2: JP S64(1989)-8665 B
Patent document 3: JP H05(1993)-50566 A
Patent document 4: JP H06(1994)-80794 A

DISCLOSURE OF INVENTION

Problem to be Solved by the Invention

Thus, a vinylidene fluoride-based resin film and a vinylidene fluoride-based resin multilayered film having excellent transparency, weather resistance, chemical resistance, break resistance and formability have been demanded.

Means for Solving Problem

As a result of keen examination, the inventors of the present invention found that a melt-extruded vinylidene fluoride-based resin is sandwiched between rollers or metal belts, while applying pressure thereto, so as to let it cool down, whereby the transparency of a film obtained can be improved remarkably, thus arriving at the present invention.

That is, the present invention relates to a vinylidene fluoride-based resin film including polyvinylidene fluoride whose average spherocrystal diameter is less than 0.1 μm, which is a detection limit or lower by observation using a transmission electron microscope, which is obtained by shaping a vinylidene fluoride-based resin in a molten state by sandwiching the resin between rollers or metal belts so as to let it cool down.

In the present invention, preferably, a haze thereof is less than 1%.

In the present invention, preferably, a temperature of the rollers or the metal belts ranges from 10 to 100° C.

Furthermore, it is preferable that a vinylidene fluoride resin is a composition containing 50 to 99.9 parts by weight of a vinylidene fluoride-based resin (D) and 0.1 to 50 parts by weight of a methacrylic-based resin composition (C).

Furthermore, a vinylidene fluoride-based resin multilayered film is preferable, including: the vinylidene fluoride resin layer according to any one of the above-stated films that serves as a surface layer; and a methacrylic-based resin composition (C) layer.

Furthermore, it is preferable that the vinylidene fluoride resin layer and the methacrylic-based resin composition (C) are shaped by co-extrusion.

Furthermore, preferably, the methacrylic-based resin composition (C) is a methacrylic-based resin composition obtained by polymerization of a methacrylate-based polymer (A) in the presence of an acrylate-based crosslinked elastic particles (B), wherein (1) the methacrylate-based polymer (A) is obtained by polymerization of a monomer mixture containing 50 to 100 weight % of alkyl methacrylate and 0 to 50 weight % of alkyl acrylate;

(2) the acrylate-based crosslinked elastic particles (B) are obtained by copolymerization of a monomer mixture (b) containing 50 to 100 weight % of alkyl acrylate and 50 to 0 weight % of alkyl methacrylate and a multi-functionality monomer having two or more non-conjugated double bonds per one molecule;

(3) 5 to 45 weight % of the acrylate-based crosslinked elastic particles (B) are contained; and (4) 0.01 to 30 parts by weight of an ultraviolet absorber indicated by General Formula (1) is copolymerized with respect to 100 parts by weight of the methacrylic based resin composition (C);

General formula (1)

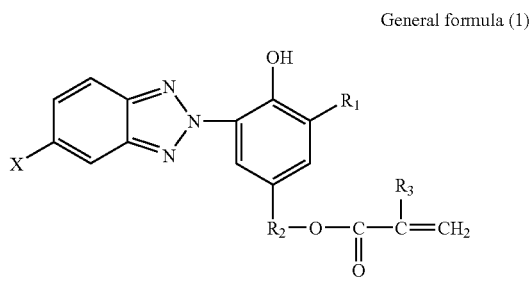

where X denotes H or halogen, $R_1$ denotes H, methyl or t-alkyl group with a carbon number of 4 to 6, $R_2$ denotes an alkylene group with a carbon number of 2 to 10 in a straight chain shape or a branch shape and $R_3$ denotes H or methyl.

A laminated product including lamination of the vinylidene fluoride-based resin film or the vinylidene fluoride-based resin multilayered film according to any one of the above-stated films is preferable and the laminated product preferably is manufactured by injection molding.

EXPLANATIONS OF REFERENCE NUMERALS

Figure 1:
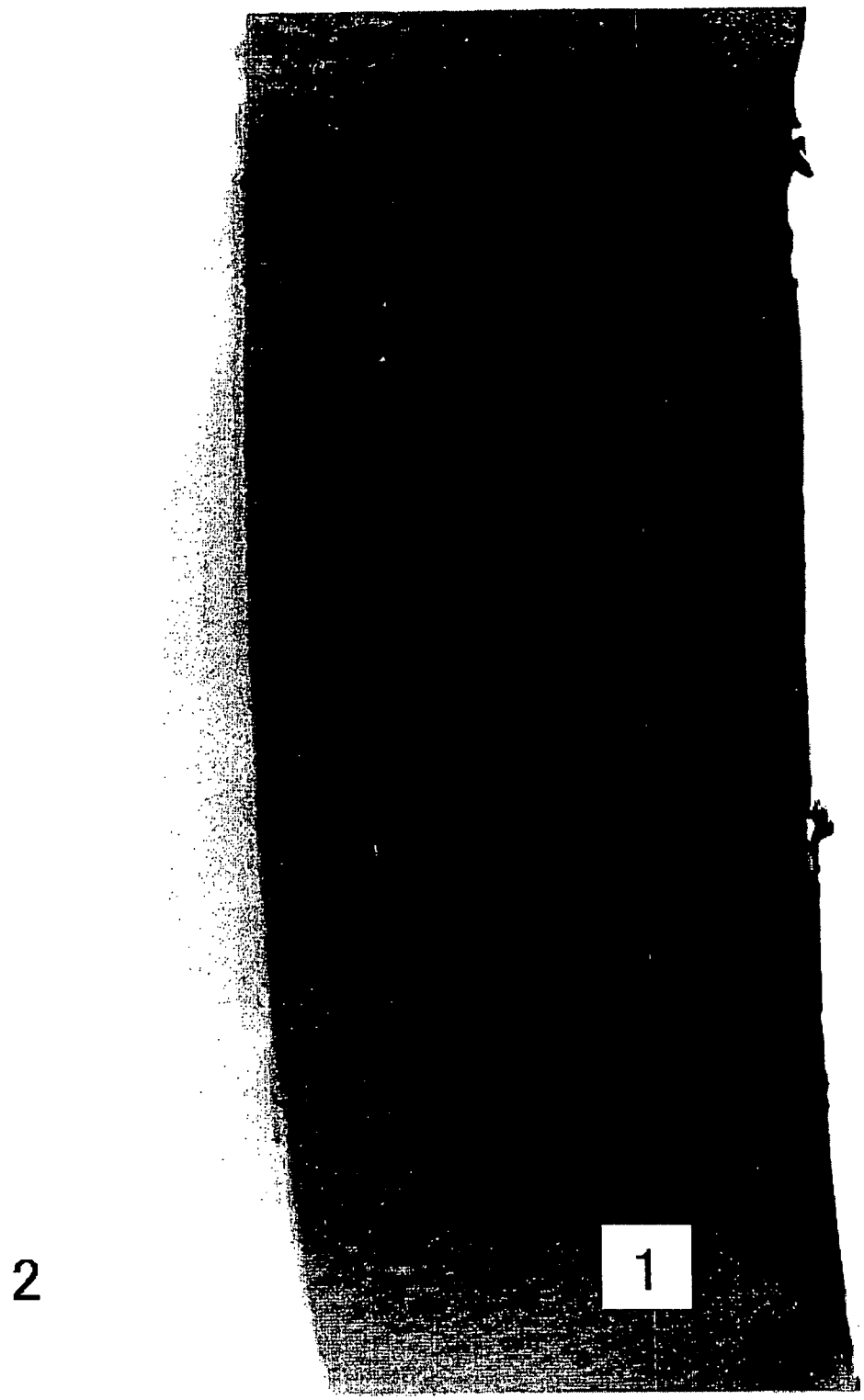
FIG. 1 is a photograph taken through the observation of Example 1 using a transmission electron microscope (magnification of 10,000 times), where a blackish layer (surface layer) is a vinylidene fluoride-based resin layer, and no spherocrystal structure as shown in FIG. 2 is observed.

1: vinylidene fluoride-based resin layer
2: methacrylic-based resin composition layer Effects of the Invention A vinylidene fluoride-based resin film and a vinylidene fluoride-based resin multilayered film of the present invention are obtained by sandwiching them between rollers or metal belts, so as to let them cool down while applying pressure thereto, and these films can solve a problem concerning transparency and at the same time have excellent weather resistance, chemical resistance, break resistance and formability, which are properties necessary for the film.

DESCRIPTION OF THE INVENTION

A vinylidene fluoride-based resin film of the present invention may be one with polyvinylidene fluoride whose average spherocrystal diameter is less than 0.1 μm, which is a detection limit by observation using a transmission electron microscope. When the average spherocrystal diameter of the polyvinylidene fluoride is 0.1 μm or more, the transparency of the vinylidene fluoride-based resin film obtained tends to be not enough.

Incidentally, the average spherocrystal diameter Do of the polyvinylidene fluoride of the present invention may be a value measured by the observation using a transmission electron microscope or measured by laser small angle scattering.

In the present invention, the observation using a transmission electron microscope is conducted as follows: that is, a sample is prepared from the vinylidene fluoride-based resin film by frozen ultrathin sectioning, and subsequently a crystal diameter of polyvinylidene fluoride is measured using a transmission electron microscope (produced by JEOL Ltd., JEM-1200EX) at an acceleration voltage of 80 kV and of a magnification of 10,000 times (detection limit: 0.1 μm). The average crystal diameter is obtained by measuring, using a vernier caliper, spherocrystal diameters of 50 pieces of spherocrystals in a photo obtained by the observation using the electron microscope and determining the average of them.

In the present invention, laser small angle scattering is conducted as follows: that is, a sample for measurement is prepared by overlaying 8 pieces of polyvinylidene fluoride resin film while tilting them by 45 degrees for each, and subsequently small angle scattering is measured using a He—Ne gas laser (produced by NEOARC Corporation, NEO-15MS; 15 mV, 632.8 nm) as a laser source and a PDA detector (produced by Hamamatsu Photonics K.K., photodiode array S6494-128). In the thus obtained scattering vector—scattering intensity chart, a scattering vector $Q_{max}$ ($nm^{-1}$) with a local maximum value of the scattering intensity is determined by curve fitting, and an average spherocrystal radius $R_0$ is calculated from the formula of $R_0=4.09/Q_{max}$. Note here that in this case a value obtained by doubling $R_0$ is used as the average spherocrystal diameter.

Incidentally, as for the polyvinylidene fluoride-based resin multilayered film described later, this film is immersed in chloroform so as to dissolve an acrylic-based resin composition (C) layer, and a vinylidene fluoride-based resin layer (film) is taken out, which is used as a sample for the small angle scattering measurement.

The vinylidene fluoride-based resin film of the present invention may have a haze of 1% or less, preferably 0.9% or less and more preferably 0.8% or less. When the haze of the polyvinylidene fluoride exceeds 1%, the transparency of the vinylidene fluoride-based resin film obtained tends to be not enough. Incidentally, the haze refers to a value measured in accordance with the Japanese Industrial Standard (JIS) K6714 at a temperature of 23° C.±2° C. and a humidity of 50%±5%. As for a multilayered film including a methacrylic-based resin composition (C), since the haze of the film as a whole is not substantially different from the haze of the polyvinylidene fluoride-based resin layer, the haze is measured for the film as a whole.

The vinylidene fluoride-based resin film of the present invention may be obtained by a method including the step of, immediately after discharging a vinylidene fluoride resin from an extruder, shaping the vinylidene fluoride-based resin in a molten state by sandwiching it between rollers or metal belts while applying pressure thereto, so as to let it cool down. On the other hand, when a vinylidene fluoride resin in a molten state is cooled down simply by bringing it into contact with a roller or a metal belt without sandwiching it between the rollers or the metal belts, the average spherocrystal diameter cannot be less than 0.1 μm, and the transparency of the obtained film will not be enough. Moreover, when a vinylidene fluoride-based resin in a molten state is shaped by sandwiching it between the rollers or the metal belts, not only can the average spherocrystal diameter be decreased, but the surface of the film also can be made smooth.

During the film shaping process of the present invention by sandwiching the resin between rollers or metal belts, the temperature, of the rollers or the metal belts preferably is kept at 10° C. to 100° C., and more preferably 20° C. to 60° C. When the temperature of the rollers or the metal belts exceeds 100° C., the transparency of the film obtained tends to deteriorate, and when it is less than 10° C., there may be a problem such as a wrinkle occurring in the film during the winding.

In the case where the vinylidene fluoride-based resin composition and the methacrylic-based resin composition (C) are shaped by co-extrusion, the temperature of a roller or a metal belt preferably is kept at 10° C. to 80° C. on the vinylidene fluoride resin composition side and at 10° C. to 100° C. on the methacrylic-based resin composition (C) side. By making the temperature of the roller or the metal belt different between on the vinylidene fluoride resin composition side and on the methacrylic-based resin composition (C) side, the transparency of the vinylidene fluoride-based resin (D) can be improved and at the same time a problem occurring during the winding of the methacrylic-based resin composition (C) can be alleviated.

During the film shaping process of the present invention by sandwiching the resin between rollers or metal belts, a distance between the lip of a dice of the extruder and a position where the resin contacts with the rollers or the metal belts preferably is 300 mm or less and more preferably 250 mm or less. The distance of 300 mm or less before contact can shorten a time until the molten resin is sandwiched between the rollers or the metal belts, thus enhancing the effects obtained by sandwiching the resin between the rollers or the metal belts.

The surface roughness of the rollers or the metal belts used in the present invention preferably is 0.5 µm or less in terms of the average surface roughness, and more preferably 0.2 µm or less. The average surface roughness of 0.5 µm or less of the rollers or the metal belts enables a smooth film having high transparency.

The material of the rollers used in the present invention is not limited particularly, and silicone resin, silicone rubber or a metal is used preferably.

The vinylidene fluoride-based resin (D) of the present invention may be a vinylidene fluoride homopolymer, a copolymer containing 70 mol % or more of vinylidene fluoride as a constitutional unit, or a mixture of these polymers. A monomer copolymerized with the vinylidene fluoride may be ethylene, propylene, tetrafluoroethylene, propylene hexafluoride, ethylene trifluoride, ethylene chloride trifluoride, vinyl fluoride or the like. These monomers may be used alone or two types or more may be used together.

Although the melting points of these vinylidene fluoride-based resins range from 145 to 180° C., the vinylidene fluoride-based resin (D) of the present invention preferably has a melting point of 165° C. or more. When the melting point of the vinylidene fluoride-based resin (D) is 165° C. or more, the deterioration of the transparency occurring after the secondary processing such as insert molding, inmold molding and lamination shaping using heated rollers can be avoided.

The vinylidene fluoride-based resin film of the present invention may be made of a vinylidene fluoride-based resin (D) only. However, in terms of the transparency and the adhesion with the methacrylic-based resin composition (C) or a lamination target, the vinylidene fluoride-based resin film of the present invention preferably is made of a composition containing 50 to 99.9 parts by weight of a vinylidene fluoride-based resin (D) and 0.1 to 50 parts by weight of a methacrylic-based resin composition (C). More preferably, it is made of a composition containing 60 to 99.9 parts by weight of a vinylidene fluoride-based resin (D) and 0.1 to 40 parts by weight of a methacrylic-based resin composition (C), and still more preferably containing 70 to 99.9 parts by weight of a vinylidene fluoride-based resin (D) and 0.1 to 30 parts by weight of a methacrylic-based resin composition (C). 0.1 part by weight or more of the methacrylic-based resin composition (C) enables the improvement of the transparency and the adhesion. Less than 50 parts by weight of the vinylidene fluoride-based resin (D) tends to degrade the chemical resistance.

The methacrylic-based resin composition (C) of the present invention is not limited particularly, and it preferably is a multilayer structured polymer obtained by the polymerization of a methacrylate-based polymer (A) in the presence of acrylate-based crosslinked elastic particles (B). More preferably, the methacrylate-based polymer (A) and the acrylate-based crosslinked elastic particles (B) may have a composition in the range described below.

The methacrylic-based resin composition (C) of the present invention may be a three-layer structured polymer obtained by the polymerization of a methacrylate-based polymer (A) and an acrylate-based crosslinked elastic particles (B), and moreover a methacrylate-based polymer (A), which are polymerized successively step by step.

The methacrylate-based polymer (A) of the present invention may be one obtained by the polymerization at at least one stage of a monomer mixture containing 50.to 100 weight % of alkyl methacrylate and 0 to 50 weight % of alkyl acrylate. More preferably, it contains 60 to 100 weight % of alkyl methacrylate and 0 to 40 weight % of alkyl acrylate. When it contains more than 50 weight % of the alkyl acrylate, the heat resistance and the surface hardness of a film obtained from the obtained methacrylic-based composition tend to deteriorate.

In terms of the polymerization reaction property and the cost, the alkyl methacrylate making up the methacrylate-based polymer (A) of the present invention preferably has an alkyl group with a carbon number ranging from 1 to 12, which may be in a straight chain shape or a branch shape. Specific examples thereof include, for example, methyl methacrylate, ethyl methacrylate, propyl methacrylate, n-butyl methacrylate, isobutyl methacrylate, t-butyl methacrylate or the like. These monomers may be used alone or two or more types may be used together.

In terms of the polymerization reaction property and the cost, the alkyl acrylate making up the methacrylate-based polymer (A) of the present invention preferably has an alkyl group with a carbon number ranging from 1 to 12, which may be in a straight chain shape or a branch shape. Specific examples thereof include, for example, methyl acrylate, ethyl acrylate, propyl acrylate, n-butyl acrylate, isobutyl acrylate, t-butyl acrylate, 2-ethylhexyl acrylate, n-octyl acrylate or the like. These monomers may be used alone or two or more types may be used together.

In the methacrylate-based polymer (A) of the present invention, an ethylene-based unsaturated monomer that is copolymerizable with the alkyl methacrylate and the alkyl acrylate may be copolymerized if necessary. Such copolymerizable ethylene-based unsaturated monomers include, for example, vinyl halides such as vinyl chloride and vinyl bromide, vinyl cyanides such as acrylonitrile and methacrylonitrile, vinyl esters such as vinyl formate, vinyl acetate and vinyl propionate, aromatic vinyl derivatives such as styrene, vinyltoluene and α-methyl styrene, vinylidene halides such as vinylidene chloride, acrylic acids such as acrylic acid, sodium acrylate and calcium acrylate and a salt thereof, alkyl acrylate derivatives such as β-hydroxyethyl acrylate, dimethylaminoethyl acrylate, glycidyl acrylate, acrylamide and N— methylol acrylamide, methacrylic acids such as methacrylic acid, sodium methacrylate and calcium methacrylate and a salt thereof and alkyl methacrylate derivatives such as methacrylamide, β-hydroxyl methacrylate, dimethylaminoethyl methacrylate, glycidyl methacrylate and the like. These monomers may be used alone or two types or more may be used together.

The acrylate-based crosslinked elastic particles (B) of the present invention may be those obtained by the copolymerization at at least one stage of a mixture of a monomer mixture (b) containing 50 to 100 weight % of alkyl acrylate and 50 to 0 weight % of alkyl methacrylate and a multi-functionality monomer having two or more non-conjugated double bonds per one molecule. The monomer mixture (b) preferably contains 60 to 100 weight % of alkyl acrylate and 40 to 0 weight % of alkyl methacrylate. When the content of the alkyl methacrylate exceeds 50%, the break resistance of a film formed from the obtained methacrylic-based resin composition tends to deteriorate.

In the acrylate-based crosslinked elastic particles (B) of the present invention, an ethylene-based unsaturated monomer that is copolymerizable with the alkyl methacrylate and the alkyl acrylate may be copolymerized if necessary.

Since a multi-functionality monomer having two or more non-conjugated reactive double bonds per one molecule is copolymerized in the acrylate-based crosslinked elastic particles (B) of the present invention, the obtained polymer shows crosslinked elasticity. Furthermore, one of the reactive functional groups (double bonds), which does not react during the polymerization of the acrylate-based crosslinked elastic particles (B) and remains, serves as a graft crosspoint, and a certain ratio of the methacrylate-based copolymer (A) is made a graft with the acrylate-based crosslinked elastic particles (B). This allows the acrylate-based crosslinked elastic particles (B) to disperse in the methacrylate-based copolymer (A) discontinuously and uniformly.

The multi-functionality monomers used in the present invention include, for example, allyl methacrylate, allyl acrylate, triallyl cyanurate, triallyl isocyanurate, diallyl phthalate, diallyl malate, divinyl adipate, divinylbenzene ethylene glycol dimethacrylate, divinylbenzene ethylene glycol diacrylate, diethylene glycol dimethacrylate, diethylene glycol diacrylate, triethylene glycol dimethacrylate, triethylene glycol diacrylate, trimethylolpropane trimethacrylate, trimethylolpropane triacrylate, tetramethylolmethane tetramethacrylate, tetramethylolmethane tetraacrylate, dipropylene glycol dimethacrylate and dipropylene glycol diacrylate. These monomers may be used alone or two types or more may be used together.

The amount of the multi-functionality monomer added to the acrylate-based crosslinked elastic particles (B) preferably is 0.05 to 20 parts by weight with respect to 100 parts by weight of the above-stated monomer mixture (b), and more preferably is 0.1 to 10 parts by weight. Less than 0.05 part by weight of the added multi-functionality monomer tends to degrade the shock resistance and the break resistance of a film formed from the methacrylic-based resin composition, and more than 20 parts by weight also tends to degrade the shock resistance and the break resistance.

Specific examples of the alkyl acrylate, the alkyl methacrylate used in the acrylate-based crosslinked elastic particles (B) of the present invention and the ethylene-based unsaturated monomer that is copolymerizable with them include those used in the methacrylate-based polymer (A) as above.

The content of the acrylate-based crosslinked elastic particles (B) of the present invention preferably is 5 to 45 weight % when the methacrylic-based resin composition (C) as a whole is considered 100 weight %, and more preferably 10 to 40 weight % and still more preferably 15 to 35 weight %. Less than 5 weight % of the acrylate-based crosslinked elastic particles (B) tends to degrade the shock resistance and the break resistance of a film formed from the methacrylic-based resin composition, and more than 45 weight % tends to degrade the hardness and the formability of the film.

The methacrylic-based resin composition (C) of the present invention further preferably is a methacrylic-based resin composition obtained by the copolymerization of an ultraviolet absorber indicated by General formula (1):

General formula (1)

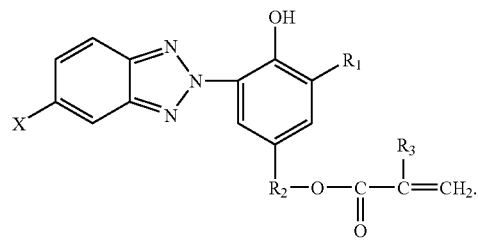

In the above formula, X denotes H or halogen, $R_1$ denotes H, methyl or t-alkyl group with a carbon number of 4 to 6, $R_2$ denotes an alkylene group with a carbon number of 2 to 10 in a straight chain shape or a branch shape and $R_3$ denotes H or methyl.

The ultraviolet absorber indicated by General Formula (1) of the present invention may be 2-(2'-hydroxy-5'-methacryloyloxy ethylphenyl)-2H-benzotriazoles, such as 2-(2'-hydroxy-5'-acryloyloxy ethylphenyl)-2H-benzotriazole, 2-(2'-hydroxy-5'-methacryloyloxy ethylphenyl)-2H-benzotriazole, 2-(2'-hydroxy-5'-methacryloyloxy ethylphenyl)-5-chloro-2H-benzotriazole, 2-(2'-hydroxy-5'-methacryloyloxy propylphenyl)-2H-benzotriazole and 2-(2'-hydroxy-5'-methacryloyloxyethyl-3'-t-butylphenyl)-2H-benzotriazole. Among them, 2-(2'-hydroxy-5'-methacryloyloxy ethylphenyl)-2H-benzotriazole is preferable in terms of the cost and the handleability.

The copolymerization ratio of the ultraviolet absorber indicated by General Formula (1) of the present invention preferably is 0.01 to 30 parts by weight with respect to 100 parts by weight of the methacrylic-based resin composition (C), more preferably 0.01 to 25 parts by weight, still more preferably 0.01 to 20 parts by weight and particularly preferably 0.05 to 20 parts by weight. Less than 0.01 part by weight of the copolymerization ratio of the ultraviolet absorber indicated by General Formula (1) tends to degrade the weather resistance of a film formed from the obtained methacrylic-based resin composition, and more than 50 parts by weight tends to degrade the shock resistance and the break resistance of the film.

The ultraviolet absorber indicated by General Formula (1) of the present invention may be copolymerized with any layer included in the methacrylic-based resin composition (C). Preferably, however, the copolymerization is conducted not only with the methacrylate-based copolymer (A) but also with the acrylate-based crosslinked elastic particles (B), and more preferably the ultraviolet absorber is copolymerized uniformly with the entire methacrylic-based resin composition (C).

The method for manufacturing the methacrylic-based resin composition (C) of the present invention is not limited particularly, and a well-known method such as emulsion polymerization, emulsion-suspension polymerization, suspension polymerization, bulk polymerization or solution polymerization is available, and among them emulsion polymerization is particularly preferable.

The method for copolymerizing the ultraviolet absorber indicated by General Formula (1) of the present invention also is not limited particularly, and the copolymerization preferably is conducted during the manufacturing of the methacrylic-based resin composition (C). As the copolymerization method, a well-known method such as emulsion polymerization, emulsion-suspension polymerization, suspension polymerization, bulk polymerization or solution polymerization is available, and among them emulsion polymerization is particularly preferable.

As an initiator of the polymerization of the acrylate-based crosslinked elastic particles (B) of the present invention, a well-known initiator such as an organic peroxide, an inorganic peroxide or an azo compound can be used. More specifically, organic peroxides such as t-butylhydroperoxide, 1,1,3,3-tetramethyl butylhydroperoxide, peroxide succinate, peroxy maleate t-butylester, cumene hydroperoxide and benzoylperoxide, inorganic peroxides such as potassium persulfate and sodium persulfate as well as oil-soluble initiators such as azobisisobutyronitrile may be used. They may be used alone or two types or more may be used together. These initiators may be used as a normal redox-type initiator that is combined with a reducing agent such as sodium sulfite, sodium thiosulfate, sodium formaldehyde sulfoxylate, ascorbic acid, hydroxyacetonate, ferrous sulfate and a complex of ferrous sulfate with ethylenediaminetetraacetic acid-2-sodium.

The above-stated organic peroxide can be added by a well-known method such as a method of adding directly to the polymerization system, a method of mixing with a monomer and adding or a method of dispersing in an emulsifier aqueous solution and adding. Among them, the method of mixing with a monomer and adding or the method of dispersing in an emulsifier aqueous solution and adding is preferable in terms of the transparency.

Furthermore, the above-stated organic peroxide preferably is used as a redox-type iniator combined with an inorganic reducing agent such as bivalent iron and/or an organic reducing agent such as formaldehyde sulfoxylate soda, reducing sugar or ascorbic acid, in terms of the polymerization stability and the controllability of a particle diameter.

A surface-active agent used for the above-stated emulsion polymerization also is not limited particularly, and any normal surface-active agent for emulsion polymerization can be used. Specific examples include, for example, anionic surface-active agents such as sodium alkylsulphonate, sodium alkylbenzensulphonate, sodium dioctylsulfosuccinate, sodium lauryl sulfate and fatty-acid sodium, nonionic surface-active agents such as reaction products of alkylphenols or aliphatic alcohols with propylene oxide and ethylene oxide. These surface-active agents may be used alone or two types or more may be used together. If necessary, cationic surface-active agents such as alkylamine salt may be used.

The obtained methacrylic-based resin composition (C) latex may undergo normal operations such as solidification, washing and drying, or a process such as spray drying or freeze drying, whereby a resin composition can be separated and collected therefrom.

An inorganic pigment or an organic pigment may be added for coloring to the vinylidene fluoride-based resin composition of the present invention (the vinylidene fluoride-based resin (D) or the vinylidene fluoride-based resin (D) and the methacrylic-based resin composition (C)). An antioxidant, a heat stabilizer, an ultraviolet absorber, an ultraviolet stabilizer and the like may be added for further improving thermal and optical stabilization of the vinylidene fluoride-based resin composition of the present invention, or an antibacterial agent, a deodorant, a lubricant and the like may be added. They may be added alone or two types or more may be added together.

Polyglutaralimide, glutaric anhydride polymer, lactone cyclization methacrylic-based resin, methacrylic-based resin, polyethylene terephthalate resin, polybutylene terephthalate resin or the like may be mixed with the vinylidene fluoride-based resin composition of the present invention (the vinylidene fluoride-based resin (D) or the vinylidene fluoride-based resin (D) and the methacrylic-based resin composition (C)) if necessary. The blending method is not limited particularly, and a well-known method can be used.

The thickness of the vinylidene fluoride-based resin film of the present invention preferably is 1 to 300 μm, and more preferably 5 to 200 μm. The film thickness less than 1 μm tends to degrade the processability of the obtained film, and the thickness more than 300 μm tends to degrade the transparency of the film.

The vinylidene fluoride-based resin film of the present invention may be shaped by lamination shaping, or may be reformed by biaxial orientation, depending on the intended use.

The vinylidene fluoride-based resin film of the present invention may be a film made of a vinylidene fluoride-based resin (composition made of the vinylidene fluoride-based resin (D) or the vinylidene fluoride-based resin (D) and the methacrylic-based resin composition (C)). However, in terms of the weather resistance (especially, the property for preventing ultraviolet rays), the cost, the formability and the adhesion with a lamination target, a vinylidene fluoride-based resin multilayered film composed of the above-stated vinylidene fluoride-based resin layer that forms a surface layer and the methacrylic-based resin composition (C) layer is preferable.

A method for manufacturing the vinylidene fluoride-based resin multilayered film composed of the above-stated vinylidene fluoride-based resin layer that forms a surface layer and the methacrylic-based resin composition (C) layer is not limited particularly, and a normal lamination technique can be used. A specific example of the lamination method includes, for example, (i) bonding the above-stated vinylidene fluoride-based resin film and a methacrylic-based resin composition (C) film that is prepared separately by melt extrusion or the like with an adhesive, and heating a laminated face of the both films, followed by crimping, (ii) co-extruding the vinylidene fluoride-based resin layer and the methacrylic-based resin composition (C) layer, or the like.

Among them, the co-extrusion technique of the vinylidene fluoride-based resin composition and the methacrylic-based resin composition (C) is preferable, in terms of securing the adhesion between the vinylidene fluoride-based resin layer and the methacrylic-based resin composition (C) layer, and the ease of controlling the thermal hysteresis of the film during the manufacture of the multilayered film.

In the present invention, in the case of the vinylidene fluoride-based resin multilayered film made of the vinylidene fluoride-based resin and the methacrylic-based resin composition (C), the thickness of the vinylidene fluoride-based resin layer preferably is 1 to 50 μm, and the thickness of the methacrylic-based resin composition (C) layer preferably is 20 to 200 μm. The thickness of the vinylidene fluoride-based resin layer less than 1 μm tends to have insufficient weather resistance, and more than 50 μm tends to be disadvantageous for the cost. The thickness of the methacrylic-based resin composition (C) layer less than 20 μm tends to generate a wrinkle during the winding of the film, and more than 200 μm tends to cause a difficulty in secondary processing.

In the vinylidene fluoride-based resin multilayered film also, the average spherocrystal diameter of polyvinylidene fluoride is less than 0.1 μm, which is a detection limit or lower by observation using a transmission electron microscope. When the average spherocrystal diameter of the polyvinylidene fluoride is 0.1 μm or more, the transparency of the vinylidene fluoride-based resin multilayered film obtained tends to be inadequate.

In the vinylidene fluoride-based resin multilayered film of the present invention also, the haze thereof is 1% or less, preferably 0.9% or less and more preferably 0.8% or less. When the haze of the polyvinylidene fluoride resin multilayered film exceeds 1%, the transparency of the vinylidene fluoride-based resin multilayered film obtained tends to be inadequate.

The gloss of the surface of the vinylidene fluoride-based resin film and the vinylidene fluoride-based resin multilayered film obtained from the vinylidene fluoride-based resin composition of the present invention may be reduced by a well-known method if necessary. For example, this can be conducted by kneading the methacrylic-based resin composition (C) with an inorganic filler or a cross-linkable polymeric particles. Alternatively, the gloss of the film surface may be reduced by emboss processing of the obtained film.

The vinylidene fluoride-based resin film and the multilayered film of the present invention may be used by laminating it on metal or plastic. The film may be laminated by lamination shaping, wet lamination, dry lamination, extrusion lamination, hot-melt lamination or the like. The wet lamination refers to a method conducted by applying an adhesive to a metal plate such as a steel plate, and placing a film on the metal plate, followed by drying for bonding.

A film may be laminated on a plastic component by insert molding, laminate-injection-press molding or inmold molding, for example. The insert molding may be conducted by disposing the film within a die, and filling with a resin by injection molding. The inmold molding may be conducted by shaping a film beforehand and disposing the film within a die, followed by filling with a resin by injection molding.

A film-laminated product obtained from the methacrylic-based resin composition of the present invention can be used as an alternative to painting for automobile interior members, automobile exterior members and the like, building materials such as window frames, equipment for bathrooms, wallpaper and floor covering, daily necessities, furniture, a housing of electrical apparatuses, a housing of office automation equipment such as a facsimile, components of electrical or electronic apparatuses and the like. Furthermore, a molded product can be used for a lighting lens, a headlight for automobiles, an optical lens, an optical fiber, an optical disk, a light-guiding plate for liquid crystals, a film for liquid crystals, medical equipment requiring a sterilization treatment, a container for microwave cooking, a housing of household electrical appliances, toys, goods for recreation or the like.

EXAMPLES

The following describes the present invention in detail by way of not-limiting examples.

Methods for measuring physical properties of the following examples and comparative examples follow:

(Evaluations of Crystallinity by Electron Microscope Observation)

Samples were prepared from the obtained film by frozen ultrathin sectioning, and subsequently crystal diameters of polyvinylidene fluoride were measured using a transmission electron microscope (produced by JEOL Ltd., JEM-1200EX) at an acceleration voltage of 80 kV and of a magnification of 10,000 times (detection limit: 0.1 μm). The average crystal diameter then was obtained by measuring, using a vernier caliper, spherocrystal diameters of 10 pieces of spherocrystals in a photo obtained by the observation using the electron microscope and determining the average of them.

(Evaluations of Crystallinity by Laser Small Angle Scattering)

The obtained film was immersed in chloroform so as to dissolve a base resin layer, whereby a polyvinylidene fluoride film was obtained. Then, 8 pieces of the thus obtained polyvinylidene fluoride film were overlaid while tilting them by 45 degrees for each, and subsequently small angle scattering was measured using a He—Ne gas laser (produced by NEOARC Corporation, NEO-15MS; 15 mV, 632.8 nm) as a laser source and a PDA detector (produced by Hamamatsu Photonics K.K., photodiode array S6494-128). A scattering vector $Q_{max}$ ($nm^{-1}$) with a local maximum value of the scattering intensity was determined by curve fitting, and an average spherocrystal radius $R_0$ was calculated from the following formula:

$$R_0 = 4.09/Q_{max}.$$

(Evaluations of Polymerization Conversion Ratio)

The obtained methacrylic-based resin composition (C) latex was dried in a hot air dryer at 120° C. for 1 hour, and the solid content was determined. Then, using the relationship of polymerization conversion ratio (%)=100×the solid content/the used monomer, the polymerization conversion ratio (%) was calculated.

(Evaluations of Transparency)

As for the transparency of the obtained film, the haze thereof was measured in accordance with the Japanese Industrial Standard (JIS) K6714 at a temperature of 23° C.±2° C. and a humidity of 50%±5%.

(Evaluations of Chemical Resistance)

A drop of xylene was dripped on the film, and a change in the film was observed visually for evaluation.

o: no change was observed x: a mark due to the drop was observed (Evaluations of Break Resistance)

The obtained film was bent by 180° for each evaluation, while observing a change in the bent portion visually.

o: no break was observed x: break was observed (Evaluations of Formability)

The film was shaped continuously for 3 hours, while observing the operation state. Then, evaluations were made by the following criteria:

o: film had a uniform thickness and was shaped without break, x: film had a nonuniform thickness and break occurred in film.

(Evaluations of the Bleeding of Ultraviolet Absorber)

The film was shaped continuously for 3 hours, while observing the adhesion state to a chill roll. Then, evaluations were made by the following criteria:

o: no adhesion to the chill roll was observed, x: adhesion to the chill roll was observed.

In the following manufacturing examples, examples and comparative examples, "parts" represents parts by weight, while "%" represents weight %. The abbreviations used represent the following substances:

PVDF-1: SOLEF1010 (produced by SOLVAY Co., PVDF homopolymer);
PVDF-2: SOLEF1008 (produced by SOLVAY Co., PVDF homopolymer);
PVDF-3: SOLEF11010 (produced by SOLVAY Co., PVDF copolymer);
BA: butyl acrylate;
MMA: methyl methacrylate;
CHP: cumene hydroperoxide;
tDM: tert-dodecyl mercaptan;
AlMA: allyl methacrylate; and
RUVA: 2-(2'-hydroxy-5'-methacryloyloxy ethylphenyl)-2-H-benzotriazole (produced by Otsuka Kagaku Co., RUVA-93).

0.5 part of CHP, and 1.4 parts of RTVA with respect to 100 parts of a monomer mixture composed of 10% of BA and 90% of MMA) was added continuously at the rate of 10 parts per hour, and the polymerization further was continued for 1 hour so as to obtain a methacrylic-based resin composition (C). The polymerization conversion ratio thereof was 98.5%. The obtained latex underwent salting-out, solidification, washing with water and a drying process, whereby resin powder (1) was obtained. Furthermore, melt-kneading was conducted using a uniaxial extruder with 40 mm diameter (φ) vent (produced by TABATA INDUSTRIAL MACHINERY Co., Ltd, HV-40-28), where the temperature of the cylinder was set at 240° C., thereby making it into pellets.

TABLE 1

|  |  | Methacrylic-based resin composition (C) |  |  |  |  |  |  |
|---|---|---|---|---|---|---|---|---|
|  |  | (1) | (2) | (3) | (4) | (5) | (6) | (7) |
| Initial amount of sodium dioctylsulfosuccinate | (parts) | 0.25 | 0.25 | 0.25 | 0.25 | 0.25 | 0.25 | 0.25 |
| Acrylate-based crosslinked elastic particles (B) | Parts by weight | 30 | 20 | 30 | 30 | 30 | 30 | 50 |
|  | BA (%) | 90 | 90 | 90 | 90 | 90 | 10 | 90 |
|  | MMA (%) | 10 | 10 | 10 | 10 | 10 | 90 | 10 |
|  | AlMA (parts) | 1 | 3 | 1 | 1 | 1 | 1 | 1 |
|  | CHP (parts) | 0.2 | 0.2 | 0.2 | 0.5 | 0.2 | 0.2 | 0.2 |
|  | RUVA(parts) | 0.6 | 0.4 | 0 | 10.5 | 0.6 | 0.6 | 1 |
| methacrylate-based polymer (A) | Parts by weight | 70 | 80 | 70 | 70 | 70 | 70 | 50 |
|  | BA (%) | 10 | 10 | 10 | 10 | 80 | 10 | 10 |
|  | MMA (%) | 90 | 90 | 90 | 90 | 20 | 90 | 90 |
|  | tDM (parts) | 0.5 | 0.5 | 0.5 | 0.5 | 0.5 | 0.5 | 0.5 |
|  | CHP (parts) | 0.5 | 0.5 | 0.5 | 1 | 0.5 | 0.5 | 0.5 |
|  | RUVA(parts) | 1.4 | 1.6 | 0 | 24.5 | 1.4 | 1.4 | 1 |
| polymerization conversion ratio | (%) | 98.5 | 98.7 | 98.6 | aggregation | 98.9 | 98.5 | 98.4 |

Manufacturing Example 1

Manufacturing of a Methacrylic—Based Resin Composition

The following substances were put in a 8L polymerizer provided with a stirrer:

| deionized water | 200 parts; |
| sodium dioctylsulfosuccinate | 0.25 part; |
| sodium formaldehyde sulfoxylate | 0.15 part; |
| ethylenediaminetetraacetic acid-2-sodium | 0.001 part; and |
| ferrous sulfate | 0.00025 part. |

The inside of the polymerizer was substituted with nitrogen gas sufficiently so as to obtain a substantially oxygen-free state, and subsequently the internal temperature was set at 60° C. Then, the monomer mixture (B) indicated at (1) of Table 1 (i.e., 30 parts of a monomer mixture containing 1 part of AlMA and 0.2 part of CHP, and 0.6 part of RUVA with respect to 100 parts of a monomer mixture composed of 90% of BA and 10% of MMA) was added continuously at the rate of 10 parts per hour, and after the completion of the addition, the polymerization further was continued for 0.5 hour so as to obtain an acrylate-based crosslinked elastic particles (B). The polymerization conversion ratio thereof was 99.5%.

Thereafter, 0.05 part of sodium dioctylsulfosuccinate was put therein, and the internal temperature was set at 60° C., and the monomer mixture (A) indicated at (1) of Table 1 (i.e., 70 parts of a monomer mixture containing 0.5 part of tDM and Manufacturing Examples 2 to 7

The polymerization was conducted in a similar manner to Manufacturing example 1 except that the compositions of the monomer mixture (B) or the monomer mixture (A) were changed as shown in Table 1, which then underwent solidification, washing with water and drying so as to obtain resin powder (2) to (7). The obtained resin powder further was melt-kneaded, thereby making it into pellets. Note here that, since in Manufacturing Example (4) the latex aggregated during the polymerization, the resin powder (4) could not be obtained, which means a failure to make it into pellets or a film, and therefore the physical properties of the film could not be evaluated.

In Manufacturing Example (3), 2 parts of TINUVIN P indicated by Structural formula 2 (produced by Ciba Specialty Chemicals Inc.,) was blended as the ultraviolet absorber with the obtained resin powder (3), which then was melt-kneaded, thus making it into pellets.

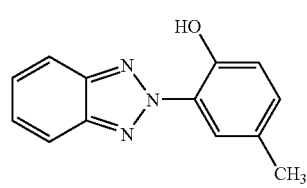

Structural formula 2

Manufacturing Example 8

98 parts of PVDF-1 and 2 parts of the resin powder (1) manufactured in Manufacturing Example (1) were blended by a Henschel mixer, and melt-kneading was conducted thereto using a uniaxial extruder with 40 mm diameter (φ) vent (produced by TABATA INDUSTRIAL MACHINERY Co., Ltd, HV-40-28), where the temperature of the cylinder was set at 240° C., thereby making it into pellets.

Manufacturing Example 9

Blending by a Henschel mixer was conducted similarly to Manufacturing Example 8, except that 45 parts of PVDF-1 and 55 parts of the resin powder (1) manufactured in Manufacturing Example (1) were used. Then melt-kneading was conducted thereto using a uniaxial extruder with 40 mm diameter (φ) vent (produced by TABATA INDUSTRIAL MACHINERY Co., Ltd, HV-40-28), where the temperature of the cylinder was set at 240° C., thereby making it into pellets.

Manufacturing Example 10

Blending by a Henschel mixer was conducted similarly to Manufacturing Example 8, except that 98 parts of PVDF-1 and 2 parts of the resin powder (2) manufactured in Manufacturing Example (2) were used. Then melt-kneading was conducted thereto using a uniaxial extruder with 40 mm diameter (φ) vent (produced by TABATA INDUSTRIAL MACHINERY Co., Ltd, HV-40-28), where the temperature of the cylinder was set at 240° C., thereby making it into pellets.

Manufacturing Example 11

2 parts of TINUVIN P indicated by Structural formula 2 (produced by Ciba Specialty Chemicals Inc.,) was blended as the ultraviolet absorber with 45 parts of PVDF-1 and 55 parts of the resin powder (3) manufactured in Manufacturing Example (3), which then was blended by a Henschel mixer similarly to Manufacturing Example 10. Then, melt-kneading was conducted thereto using a uniaxial extruder with 40mm diameter (φ) vent, where the temperature of the cylinder was set at 240° C., thereby making it into pellets.

Examples 1 to 8, Comparative Examples 1 to 4

The methacrylic-based resin composition obtained in Manufacturing Example (1) as a base resin and the resin compositions shown in Table 2 as a surface layer resin were shaped using an extruder with a two-types and two-layers T-die (feed-block type) (two 60 mm extruders) at the dice temperature of 240° C., which then was sandwiched between metal rollers whose temperature was controlled as shown in Table 2, whereby a film of 60 μm in thickness (base resin layer: 53 μm, and surface resin layer: 7 μm) was obtained.

Using the thus obtained film, various properties were evaluated. Table 2 shows the results of the evaluations.

TABLE 2

| | | Examples | | | | | | |
|---|---|---|---|---|---|---|---|---|
| | | 1 | 2 | 3 | 4 | 5 | 6 | 7 |
| | | | | | | Ex. 8 | Ex. 9 | Ex. 10 |
| Surface layer resin | Vinylidene fluoride-based resin (D) | PVDF-1 100 parts | PVDF-1 100 parts | PVDF-2 100 parts | PVDF-3 100 parts | PVDF-1 98 parts | PVDF-1 45 parts | PVDF-1 98 parts |
| | methacrylic-based resin composition (C) | — | — | — | — | (1) 2 parts | (1) 55 parts | (2) 2 parts |
| Base resin | methacrylic-based resin composition (C) | (1) 100 parts | (1) 100 parts | (1) 100 parts | (1) 100 parts | (1) 100 parts | (1) 100 parts | (1) 100 parts |
| Sandwiching rollers | | Both sides | Both sides | Both sides | Both sides | Both sides | Both sides | Both sides |
| Surface resin side temperature (° C.) | | 30 | 60 | 30 | 30 | 30 | 30 | 30 |
| Base resin side temperature (° C.) | | 30 | 90 | 30 | 30 | 30 | 30 | 30 |
| Average spherocrystal diameter | observation with transmission electron microscope of magnification of 10,000 times (detection limit: 0.1 μm) | <0.1 | <0.1 | <0.1 | <0.1 | <0.1 | <0.1 | <0.1 |
| Film properties | Transparency•Haze (%) | 0.7 | 0.8 | 0.7 | 0.7 | 0.5 | 0.4 | 0.6 |
| | Chemical resistance | ○ | ○ | ○ | ○ | ○ | X | ○ |
| | Break resistance | ○ | ○ | ○ | ○ | ○ | ○ | ○ |
| | Formability | ○ | ○ | ○ | ○ | ○ | ○ | ○ |
| | Bleeding property | ○ | ○ | ○ | ○ | ○ | ○ | ○ |

| | | Examples | Comparative Examples | | | |
|---|---|---|---|---|---|---|
| | | 8 | 1 | 2 | 3 | 4 |
| | | | | | | Ex. 8 |
| Surface layer resin | Vinylidene fluoride-based resin (D) | Ex. 11 PVDF-1 45 parts | PVDF-1 100 parts | PVDF-1 100 parts | PVDF-1 100 parts | PVDF-1 98 parts |
| | methacrylic-based resin composition (C) | (3) 55 parts | — | — | — | (1) 2 parts |
| Base resin | methacrylic-based resin composition (C) | (1) 100 parts | (1) 100 parts | (1) 100 parts | (1) 100 parts | (1) 100 parts |
| Sandwiching rollers | | Both sides | not used | surface layer only | Both sides | not used |
| Surface resin side temperature (° C.) | | 30 | — | 30 | 120 | — |
| Base resin side temperature (° C.) | | 30 | — | — | 120 | — |

TABLE 2-continued

| | | | | | | |
|---|---|---|---|---|---|---|
| Average spherocrystal diameter | observation with transmission electron microscope of magnification of 10,000 times (detection limit: 0.1 μm) | <0.1 | 3.0 | 2.4 | 2.6 | 2.6 |
| Film properties | Transparency•Haze (%) | 0.5 | 5.5 | 3.6 | 3.6 | 4.9 |
| | Chemical resistance | ○ | ○ | ○ | ○ | ○ |
| | Break resistance | ○ | ○ | ○ | ○ | ○ |
| | Formability | ○ | ○ | ○ | ○ | ○ |
| | Bleeding property | X | ○ | ○ | ○ | ○ |

Figure 2:
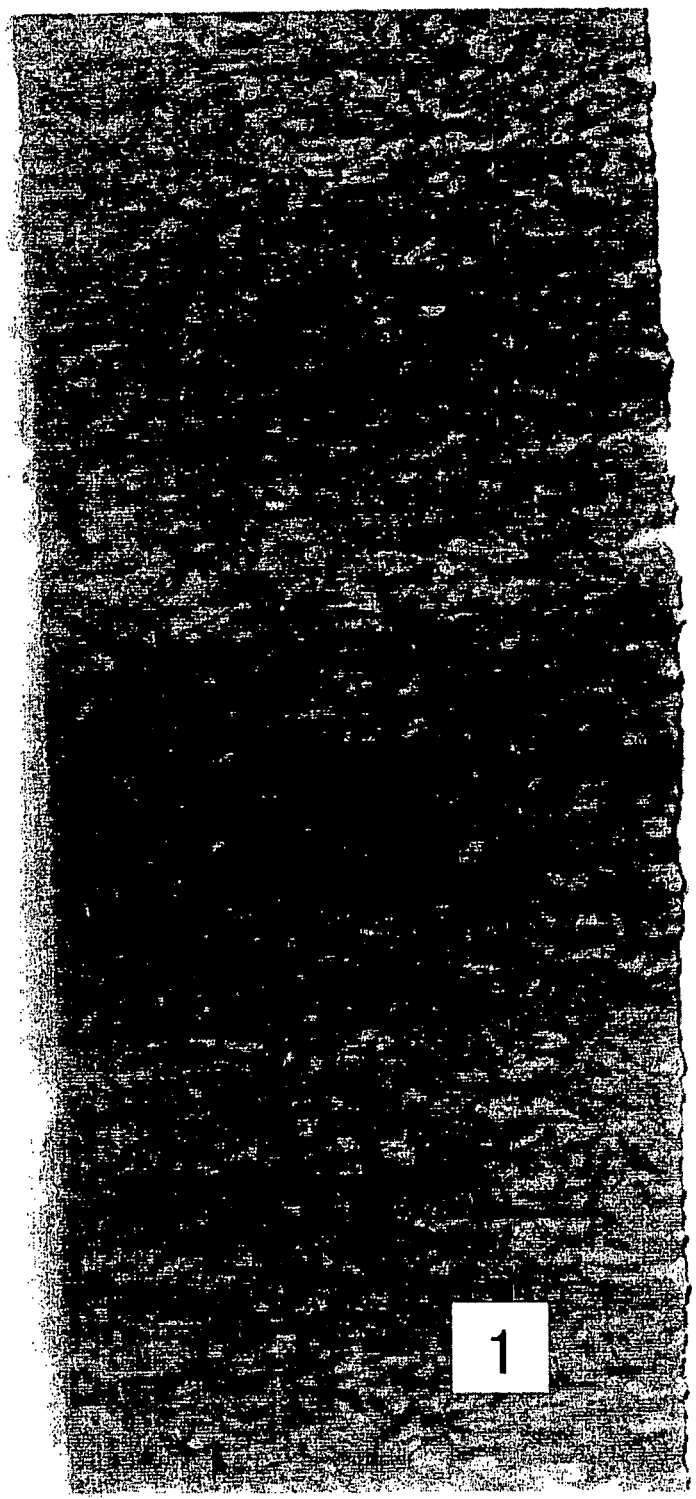
FIG. 2 is a photograph taken through the observation of Comparative example 1 using a transmission electron microscope (magnification of 10,000 times), where a blackish layer (surface layer) is a vinylidene fluoride-based resin layer, and spherocrystal structures with the average diameter of 3.0 μm are observed all over the photograph.

Photographs taken through the observation of Example 1 and Comparative Example 1 using a transmission electron microscope (magnification of 10,000 times) are shown in FIGS. 1 and 2.

Note here that, concerning Example 1 and Comparative Example 1, the average crystal radius $R_0$ of the polyvinylidene fluoride was measured by laser small angle scattering. However, in Example 1, the scattering intensity was so small that it could not be detected, and the generation of spherocrystals was not observed. On the other hand, in Comparative Example 1, $R_0$=1.48 μm (2.96 μm as the average spherocrystal diameter).

Examples 9 to 13

The methacrylic-based resin composition obtained in Manufacturing Example shown in Table 3 as a base resin and PVDF-1 as a surface layer resin were shaped using an extruder with a two-types and two-layers T-die (feed-block type) (two 60 mm extruders) at the dice temperature of 240° C., which was then sandwiched between rollers whose temperature was controlled as shown in Table 3, whereby a film of 60 μm in thickness (base resin layer: 53 μm, and surface resin layer: 7 μm) was obtained.

Using the thus obtained film, various properties were evaluated. Table 3 shows the results of the evaluations.

By sandwiching the resin between rollers, a film having excellent transparency could be obtained. It was found that when the monomer composition ratio of the methacrylic-based resin composition (C) and the content of the acrylate-based crosslinked elastic particles (B) are beyond the ranges of the present invention, the break resistance and the formability of the obtained film were degraded.

The invention claimed is:

1. A vinylidene fluoride resin film, comprising polyvinylidene fluoride whose average spherocrystal diameter is less than 0.1 μm by observation using a transmission electron microscope, the average spherocrystal diameter being obtained by shaping a vinylidene fluoride resin in a molten state by sandwiching the resin between rollers or metal belts so as to let it cool down,
    wherein the vinylidene fluoride resin is a composition comprising 50 to 99.9 parts by weight of a vinylidene fluoride resin (D) and 0.1 to 50 parts by weight of a methacrylic resin composition (C).

2. The vinylidene fluoride resin film according to claim 1, wherein a haze of the vinylidene fluoride resin film is less than 1%.

3. The vinylidene fluoride resin film according to claim 1 wherein a temperature of the rollers or the metal belts ranges from 10 to 100° C.

TABLE 3

| | | Examples | | | | | | Comp. Ex. |
|---|---|---|---|---|---|---|---|---|
| | | 1 | 9 | 10 | 11 | 12 | 13 | 1 |
| surface layer resin | vinylidene fluoride-based resin (D) | PVDF-1 100 parts | PVDF-1 100 parts | PVDF-1 100 parts | PVDF-1 100 parts | PVDF-1 100 parts | PVDF-1 100 parts | PVDF-1 100 parts |
| Base resin | methacrylic-based resin composition (C) | (1) 100 parts | (2) 100 parts | (3) 100 parts | (5) 100 parts | (6) 100 parts | (7) 100 parts | (1) 100 parts |
| Sandwiching roll | | Both sides | Both sides | Both sides | Both sides | Both sides | Both sides | not used |
| Surface resin side temperature (° C.) | | 30 | 30 | 30 | 30 | 30 | 30 | — |
| Base resin side temperature (° C.) | | 30 | 30 | 30 | 30 | 30 | 30 | — |
| Average spherocrystal diameter | observation with transmission electron microscope of magnification of 10,000 times (detection limit: 0.1 μm) | <0.1 | <0.1 | <0.1 | <0.1 | <0.1 | <0.1 | 3.0 |
| Film properties | Transparency•Haze (%) | 0.7 | 0.7 | 0.7 | 0.7 | 0.7 | 0.7 | 5.5 |
| | Chemical resistance | ○ | ○ | ○ | ○ | ○ | ○ | ○ |
| | Break resistance | ○ | ○ | ○ | ○ | X | ○ | ○ |
| | Formability | ○ | ○ | ○ | X | ○ | X | ○ |
| | Bleeding property | ○ | ○ | X | ○ | ○ | ○ | ○ |

*) Since latex aggregated during emulsion polymerization in Manufacturing example (4), resin powder (4) was not obtained, so that no film could not be manufactured.

4. The vinylidene fluoride resin film according to claim 1, further comprising a methacrylic resin composition (C) layer laminated on one side of the vinylidene fluoride resin layer.

5. The vinylidene fluoride resin multilayered film according to claim 4, wherein the vinylidene fluoride resin layer and the methacrylic resin composition (C) are shaped by co-extrusion.

6. The vinylidene fluoride resin film according to claim 4, wherein the methacrylic resin composition (C) is a methacrylic resin composition obtained by polymerization of a methacrylate polymer (A) in the presence of acrylate crosslinked elastic particles (B), wherein (1) the methacrylate polymer (A) is obtained by polymerization of a monomer mixture comprising 50 to 100 weight % of alkyl methacrylate and 0 to 50 weight % of alkyl acrylate;

(2) the acrylate crosslinked elastic particles (B) are obtained by copolymerization of a monomer mixture (b) comprising 50 to 100 weight % of alkyl acrylate and 50 to 0 weight % of alkyl methacrylate and a multi-functionality monomer having two or more non-conjugated double bonds per one molecule;

(3) 5 to 45 weight % of the acrylate crosslinked elastic particles (B) are contained; and (4) 0.01 to 30 parts by weight of an ultraviolet absorber indicated by the following General Formula (1) is copolymerized with respect to 100 parts by weight of the methacrylic resin composition (C);

General formula (1)

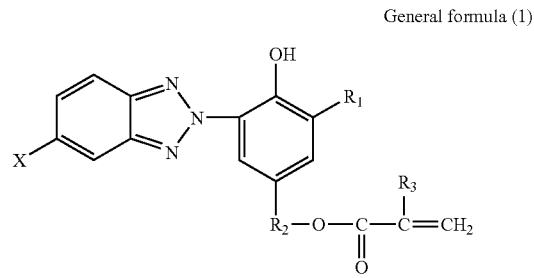

where X denotes H or halogen, $R_1$ denotes H, methyl or t-alkyl group with a carbon number of 4 to 6, $R_2$ denotes an alkylene group with a carbon number of 2 to 10 in a straight chain shape or a branch shape and $R_3$ denotes H or methyl.

7. The vinylidene fluoride resin film according to claim 1, wherein the methacrylic resin composition (C) is a methacrylic resin composition obtained by polymerization of a methacrylate polymer (A) in the presence of acrylate crosslinked elastic particles (B), wherein (1) the methacrylate polymer (A) is obtained by polymerization of a monomer mixture comprising 50 to 100 weight% of alkyl methacrylate and 0 to 50 weight % of alkyl acrylate;

(2) the acrylate crosslinked elastic particles (B) are obtained by copolymerization of a monomer mixture (b) comprising 50 to 100 weight % of alkyl acrylate and 50 to 0 weight % of alkyl methacrylate and a multi-functionality monomer having two or more non-conjugated double bonds per one molecule;

(3) 5 to 45 weight % of the acrylate crosslinked elastic particles (B) are contained; and (4) 0.01 to 30 parts by weight of an ultraviolet absorber indicated by the following General Formula (1) is copolymerized with respect to 100 parts by weight of the methacrylic resin composition (C);

(Formula 1)

General formula (1)

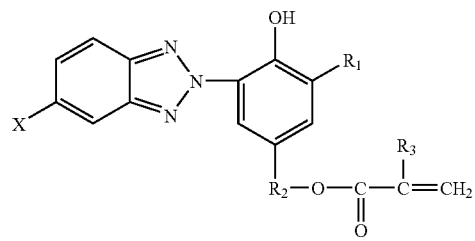

where X denotes H or halogen, $R_1$ denotes H, methyl or t-alkyl group with a carbon number of 4 to 6, $R_2$ denotes an alkylene group with a carbon number of 2 to 10 in a straight chain shape or a branch shape and $R_3$ denotes H or methyl.

8. A laminated product, comprising lamination including a vinylidene fluoride resin film comprising polyvinylinide fluoride whose average spherocrystal diameter is less than 0.1 μm by observation using a transmission electron microscope, the average spherocrystal diameter being obtained by shaping a vinylidene fluoride resin in a molten state by sandwiching the resin between rollers or metal belts so as to let it cool down, wherein the vinylidene fluoride resin is a composition comprising 50 to 99.9 parts by weight of a vinylidene fluoride resin (D) and 0.1 to 50 parts by weight of a methacrylic resin composition (C).

9. The laminated product according to claim 8, manufactured by injection molding.

10. A laminated product, comprising lamination including a vinylidene fluoride resin film and a methacrylic resin film, the vinylidene fluoride resin film comprising polyvinylidene fluoride whose average spherocrystal diameter is less than 0.1 μm by observation using a transmission electron microscope, the average spherocrystal diameter being obtained by co-extruding a vinylidene fluoride resin and a methacrylic resin composition (C) and by sandwiching the resins in a molten state between rollers or metal belts so as to let them cool down, wherein the vinylidene fluoride resin is a composition comprising 50 to 99.9 parts by weight of a vinylidene fluoride resin (D) and 0.1 to 50 parts by weight of a methacrylic resin composition (C).

11. The laminated product according to claim 10, manufactured by injection molding.

* * * * *